United States Patent
Nonami

(10) Patent No.: US 12,491,918 B2
(45) Date of Patent: Dec. 9, 2025

(54) AUTOMOBILE AND CONTROL METHOD FOR AUTOMOBILE

(71) Applicant: TOYOTA JIDOSHA KABUSHIKI KAISHA, Toyota (JP)

(72) Inventor: Tomonori Nonami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/769,087

(22) Filed: Jul. 10, 2024

(65) Prior Publication Data

US 2025/0058805 A1 Feb. 20, 2025

(30) Foreign Application Priority Data

Aug. 17, 2023 (JP) .................. 2023-132983

(51) Int. Cl.
  *B60W 60/00* (2020.01)
  *B60W 10/18* (2012.01)
  *B60W 50/08* (2020.01)

(52) U.S. Cl.
  CPC ........ *B60W 60/0055* (2020.02); *B60W 10/18* (2013.01); *B60W 50/08* (2013.01)

(58) Field of Classification Search
  CPC ......... B60W 60/0055; B60W 60/0053; B60W 60/001; B60W 60/005; B60W 10/18; B60W 10/04; B60W 10/20; B60W 50/08; B60W 50/082; B60W 50/087; B60W 50/10; B60W 50/12; B60W 2540/10; B60W 40/09
  USPC ............................ 701/41, 42, 43, 44, 48, 70
  See application file for complete search history.

(56) References Cited

U.S. PATENT DOCUMENTS

| | | | |
|---|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2019/0210586 A1 | 7/2019 | Aizawa |
| 2019/0295419 A1 | 9/2019 | Tosa et al. |
| 2020/0324792 A1 | 10/2020 | Kunihiro |

FOREIGN PATENT DOCUMENTS

| | | |
|---|---|---|
| JP | 2018-144782 A | 9/2018 |
| JP | 2020-172182 A | 10/2020 |

*Primary Examiner* — Hai H Huynh
(74) *Attorney, Agent, or Firm* — Dinsmore & Shohl LLP

(57) ABSTRACT

An automobile configured to control a drive device, a brake device, a steering device such that traveling is performed in a driving mode selected by a driver from a full-autonomous driving mode, a semi-autonomous driving mode, and a manual driving mode, using information from a periphery recognition device that acquires information about the periphery of a vehicle, and a control method for the automobile are provided. An electronic control unit included in the automobile is configured to permit an override request due to an accelerator operation by the driver, when the driver has selected the semi-autonomous driving mode, and to restrict the override request due to the accelerator operation by the driver, when the driver has selected the full-autonomous driving mode, compared to when the driver has selected the semi-autonomous driving mode.

10 Claims, 2 Drawing Sheets

AUTOMOBILE AND CONTROL METHOD FOR AUTOMOBILE

CROSS-REFERENCE TO RELATED APPLICATION

This application claims priority to Japanese Patent Application No. 2023-132983 filed on Aug. 17, 2023, incorporated herein by reference in its entirety.

BACKGROUND

1. Technical Field

The present disclosure relates to an automobile, and specifically, relates to an automobile that travels in a driving mode selected from a full-autonomous driving mode, a semi-autonomous driving mode, and a manual driving mode, and a control method for the automobile.

2. Description of Related Art

As this kind of automobile, conventionally, there has been proposed a vehicle that has a first autonomous driving mode and a second autonomous driving mode and in which it is harder to accept an override request by a driver when the second autonomous driving mode has been selected, compared to when the first autonomous driving mode has been selected (see Japanese Unexamined Patent Application Publication No. 2020-172182, for example). In this automobile, the driving mode is determined based on a predetermined reliability condition, and the level of override is adjusted for the determined driving mode. The "override" means that a control is performed based on a required value due to an operation (an accelerator operation, a brake operation, or the like) by the driver in the case where a full-autonomous driving mode or a semi-autonomous driving mode has been selected as the driving mode and where the required value due to the operation by the driver is larger than a required value computed by an electronic control unit at the time of the traveling in the full-autonomous driving mode or the semi-autonomous driving mode.

SUMMARY

However, in the above-described automobile, since the driving mode is determined based on the predetermined reliability condition, the traveling is sometimes performed in a driving mode that is not intended by the driver. In this case, an override control that is not intended by the driver is performed, so that the driver has a feeling of strangeness.

Hence, for more properly controlling the override caused by the accelerator operation by the driver, the present disclosure provides an automobile that takes the following measures and a control method for the automobile.

A first aspect of the present disclosure relates to an automobile including an electronic control unit. The electronic control unit is configured to control a drive device, a brake device, and a steering device such that traveling is performed in a driving mode selected by a driver from a full-autonomous driving mode, a semi-autonomous driving mode, and a manual driving mode, using information from a periphery recognition device that acquires information about the periphery of a vehicle. The electronic control unit is configured to permit an override request due to an accelerator operation by the driver, when the driver has selected the semi-autonomous driving mode. The electronic control unit is configured to restrict the override request due to the accelerator operation by the driver, when the driver has selected the full-autonomous driving mode, compared to when the driver has selected the semi-autonomous driving mode.

The above automobile in the first aspect controls the drive device, the brake device, and the steering device such that the traveling is performed in the driving mode selected by the driver from the full-autonomous driving mode, the semi-autonomous driving mode, and the manual driving mode, using the information from the periphery recognition device that acquires the information about the periphery of the vehicle. When the driver has selected the semi-autonomous driving mode, the override request due to the accelerator operation by the driver is permitted, and when the driver has selected the full-autonomous driving mode, the override request due to the accelerator operation by the driver is restricted compared to when the driver has selected the semi-autonomous driving mode. Thereby, it is possible to prioritize the accelerator operation by the driver when the driver has selected the semi-autonomous driving mode, and to cope with an unexpected accelerator operation when the driver has selected the full-autonomous driving mode by the driver. As a result, it is possible to more properly control the override caused by the accelerator operation by the driver.

In the above automobile in the first aspect, the electronic control unit may be configured to restrict the override request due to the accelerator operation by the driver by controlling the brake device, when the driver has selected the full-autonomous driving mode, compared to when the driver has selected the semi-autonomous driving mode. In the automobile having the above configuration, when the driver has selected the semi-autonomous driving mode, the override request due to the accelerator operation by the driver is permitted, and when the driver has selected the full-autonomous driving mode, the override request due to the accelerator operation by the driver is restricted by controlling the brake device, compared to when the driver has selected the semi-autonomous driving mode. In the automobile having this configuration, it is possible to prioritize the accelerator operation by the driver when the driver has selected the semi-autonomous driving mode, and to cope with an unexpected accelerator operation when the driver has selected the full-autonomous driving mode by the driver. As a result, it is possible to more properly control the override caused by the accelerator operation by the driver.

In the above automobile in the first aspect, the electronic control unit may be configured to prohibit the override request due to the accelerator operation by the driver, when the driver has selected the full-autonomous driving mode. In the automobile having this configuration, even when an unexpected accelerator operation is performed when the driver has selected the full-autonomous driving mode, the autonomous driving can be continued.

In the above automobile in the first aspect, the electronic control unit may be configured to restrict override caused by the accelerator operation by the driver, when the driver has selected the full-autonomous driving mode. Further, in the above automobile in the first aspect, the electronic control unit may be configured to control the brake device by setting a required torque to a value resulting from subtracting a predetermined value from a manual driving torque, when the manual driving torque exceeds an autonomous driving torque by the predetermined value or more. Furthermore, in the above automobile in the first aspect, the electronic control unit may be configured to control the brake device by setting a required torque to a value resulting from multiplying a manual driving torque by a coefficient smaller than one, when the value resulting from multiplying the manual driving torque by the coefficient exceeds an autonomous driving torque.

In the above autonomous in the first aspect, the electronic control unit may be configured to execute an automatic selection by which one of the full-autonomous driving mode and the semi-autonomous driving mode is selected without the selection by the driver, depending on a situation. Moreover, the electronic control unit may be configured to restrict the override request due to the accelerator operation by the driver at a time of the traveling in the driving mode selected by the driver, compared to the override request due to the accelerator operation by the driver at a time of the traveling in the driving mode by the automatic selection. The automobile having the above configuration may be configured to perform the restriction by controlling the brake device, compared to the override request due to the accelerator operation by the driver at the time of the traveling in the driving mode by the automatic selection. In the automobile having this configuration, at the time of the traveling in the driving mode selected by the driver, the override can be permitted in the semi-autonomous driving mode, and the override can be restricted (prohibition is included) in the full-autonomous driving mode. On the other hand, at the time of the traveling in the driving mode by the automatic selection, the override can be permitted in both the semi-autonomous driving mode and the full-autonomous driving mode. In this way, when the driving mode has been selected by the autonomous selection, the restriction of the override is reduced compared to when the driving mode has been selected by driver's selection. Thereby, it is possible to prioritize the accelerator operation by the driver at the time of the traveling in the full-autonomous driving mode or the semi-autonomous driving mode by the automatic selection.

In the above automobile in the first aspect, the electronic control unit may be configured to permit an override request due to a brake operation by the driver, regardless of whether the driver has selected the semi-autonomous driving mode or the full-autonomous driving mode. In the automobile having this configuration, it is possible to prioritize the brake operation by the driver, regardless of whether the driver has selected the semi-autonomous driving mode or the full-autonomous driving mode.

A second aspect of the present disclosure relates to a control method for an automobile. The control method includes: (i) controlling a drive device, a brake device, and a steering device such that traveling is performed in a driving mode selected by a driver from a full-autonomous driving mode, a semi-autonomous driving mode, and a manual driving mode, using information from a periphery recognition device that acquires information about the periphery of a vehicle; (ii) permitting an override request due to an accelerator operation by the driver, when the driver has selected the semi-autonomous driving mode; and (iii) restricting the override request due to the accelerator operation by the driver, when the driver has selected the full-autonomous driving mode, compared to when the driver has selected the semi-autonomous driving mode.

In the above control method for the automobile in the second aspect, it is possible to prioritize the accelerator operation by the driver when the driver has selected the semi-autonomous driving mode, and to cope with an unexpected accelerator operation when the driver has selected the full-autonomous driving mode by the driver. As a result, it is possible to more properly control the override caused by the accelerator operation by the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
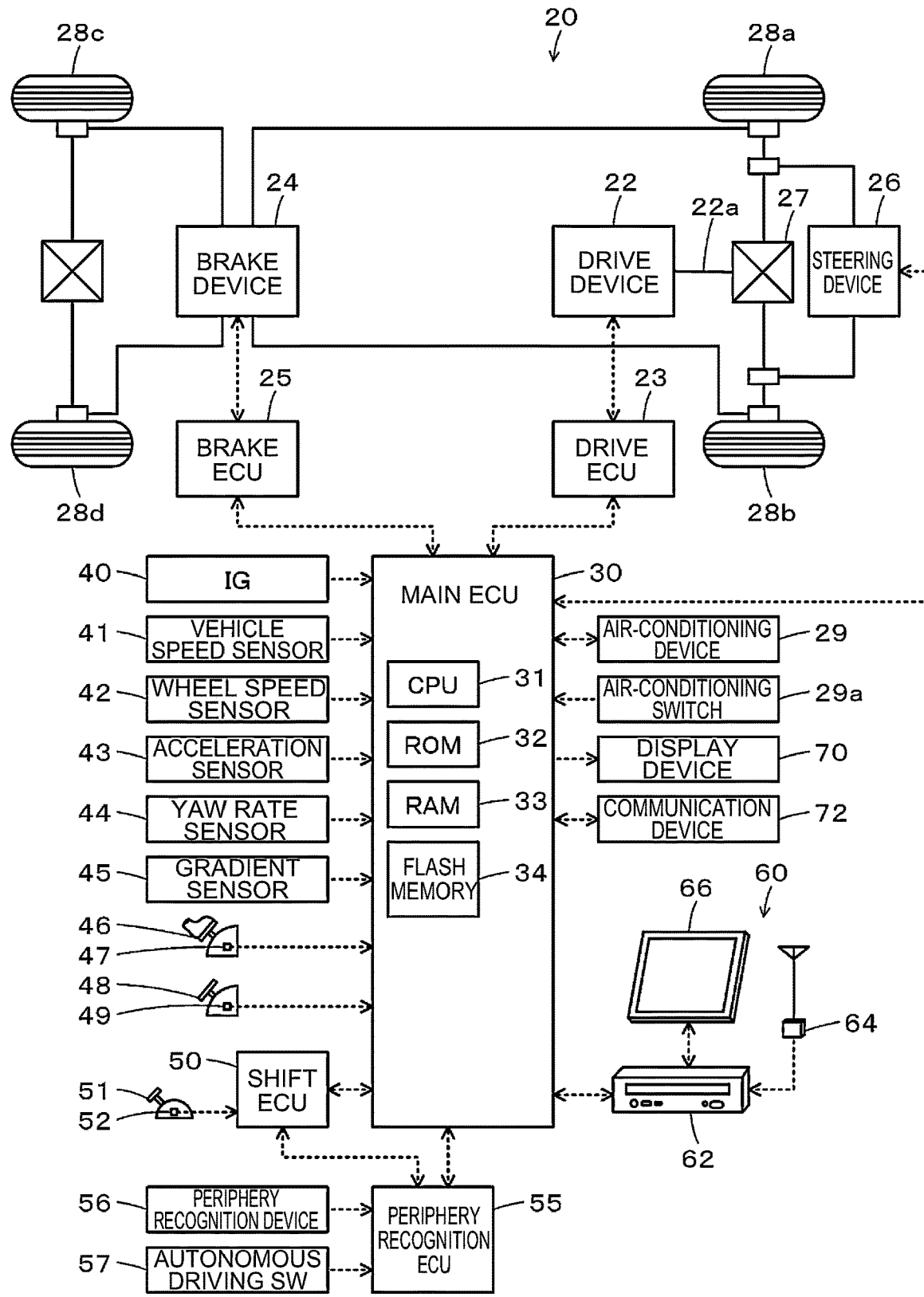
FIG. 1 is a configuration diagram showing a schematic configuration of an automobile in an embodiment as an example of the present disclosure.

Next, an embodiment as an example for carrying out the present disclosure will be described. FIG. 1 is a configuration diagram showing a schematic configuration of an automobile 20 in the embodiment of the present disclosure. As shown in the figure, the automobile 20 in the embodiment includes a drive device 22, a drive device electronic control unit (referred to as a "drive ECU", hereinafter) 23, a brake device (braking device) 24, a brake electronic control unit (referred to as a "brake ECU", hereinafter) 25, a steering device 26, and an electronic control unit (referred to as a "main ECU", hereinafter) 30.

The drive device 22 is configured as a device that drives and rotates an output shaft 22a of the drive device 22, and corresponds to, for example, a device that includes a motor, an inverter, and a battery and that causes the automobile 20 to serve as a battery electric vehicle, a device that includes an engine, an automatic transmission, and a fuel tank and that causes the automobile 20 to serve as a general engine-equipped automobile, a device that includes an engine, a fuel tank, a motor, an inverter, and a battery and that causes the automobile 20 to serve as a hybrid electric vehicle, or a device that includes a hydrogen tank, a fuel cell, a motor, and an inverter and that causes the automobile 20 to serve as a fuel cell electric vehicle. The output shaft 22a of the drive device 22 is coupled to drive wheels 28a, 28b through a differential gear 27. The drive device 22 is driven and controlled by the drive ECU 23. Although not illustrated, the drive ECU 23 includes a microcomputer that includes a CPU, a ROM, a RAM, a flash memory, input and output ports, and a communication port. To the drive ECU 23, signals from various sensors necessary for operating and controlling the drive device 22 are input through the input port. Further, from the drive ECU 23, various control signals for operating and controlling the drive device 22 are output through the output port. The drive ECU 23 computes a rotation number N of the output shaft 22a of the drive device 22, based on a rotational position θ from an unillustrated rotational position detection sensor that is attached to the output shaft 22a. The drive ECU 23 communicates with the main ECU 30 through the communication port.

The brake device 24 is configured as a well-known hydraulically driven brake device, and is configured to be capable of giving a braking force caused by a brake depressing force due to the depression of the brake pedal 48 and a braking force caused by oil pressure adjustment, to the drive wheels 28a, 28b and coupled drive wheels 28c, 28d. The brake device 24 is driven and controlled by the brake ECU 25. Although not illustrated, the brake ECU 25 includes a microcomputer that includes a CPU, a ROM, a RAM, a flash memory, input and output ports, and a communication port. The brake ECU 25 controls the braking force caused by the brake depressing force to the brake device 24 and the braking force caused by the oil pressure adjustment. The brake ECU 25 communicates with the main ECU 30 through the communication port.

In the steering device 26, an unillustrated steering wheel and the drive wheels 28a, 28b are mechanically connected through a steering shaft, and an actuator for steering is included. The steering device 26 steers the drive wheels 28a, 28b based on the operation by a driver, and steers the drive wheels 28a, 28b by driving the actuator based on a steering signal from the main ECU 30.

An air-conditioning device 29, which includes a refrigeration cycle and a blower fan, performs vehicle cabin air-conditioning when an air-conditioning switch 29a is in an on-state, and does not perform the vehicle cabin air-conditioning when the air-conditioning switch 29a is in an off-state.

The main ECU 30 includes a microcomputer that includes a CPU 31, a ROM 32, a RAM 33, a flash memory 34, unillustrated input and output ports, and an unillustrated communication port. To the main ECU 30, signals from various sensors are input through the input port. Examples of the signal that is input to the main ECU 30 include turning-on and turning-off signals from the air-conditioning switch 29a for instructions to turn on and turn off the air-conditioning device 29. In addition, examples of the signal that is input to the main ECU 30 include an ignition signal from an ignition switch 40, a vehicle speed V from a vehicle speed sensor 41, each wheel speed from a wheel speed sensor 42, an acceleration a from an acceleration sensor 43, a yaw rate Yr from a yaw rate sensor 44, and a road surface gradient Or from a gradient sensor 45. Further, examples of the signal that is input to the main ECU 30 include an accelerator operation amount Acc from an accelerator pedal position sensor 47 that detects the depression amount of an accelerator pedal 46, and a brake pedal position BP from a brake pedal position sensor 49 that detects the depression amount of the brake pedal 48.

From the main ECU 30, various control signals are output through the output port. Examples of the control signal that is output from the main ECU 30 include a control signal to the steering device 26, an air-conditioning control signal to the air-conditioning device 29, a display control signal to a display device 70, and a communication control signal to a communication device 72. As described above, the main ECU 30 communicates with the drive ECU 23, the brake ECU 25 and the like through the communication port. Further, the main ECU 30 communicates with a shift electronic control unit (referred to as a "shift ECU", hereinafter) 50, a periphery recognition electronic control unit (referred to as a "periphery recognition ECU", hereinafter) 55, and a navigation device 60 through the communication port.

Although not illustrated, the shift ECU 50 includes a microcomputer that includes a CPU, a ROM, a RAM, a flash memory, input and output ports, and a communication port. To the shift ECU 50, a shift position signal from a shift position sensor 52 that detects the operation position of a shift lever 51 is input through the input port. As shift positions, there are a parking position (P range), a neutral position (N range), a drive position (D range), and a reverse position (R range). The shift ECU 50 is connected with the periphery recognition ECU 55 through the communication port, in addition to the main ECU 30, sets the shift position based on the shift position signal from the shift position sensor 52 and a control signal from the periphery recognition ECU 55, and sends the set shift position to the main ECU 30.

Although not illustrated, the periphery recognition ECU 55 includes a microcomputer that includes a CPU, a ROM, a RAM, a flash memory, input and output ports, and a communication port. To the periphery recognition ECU 55, various signals are input through the input port. Examples of the signal that is input to the periphery recognition ECU 55 include signals from the periphery recognition device 56 that indicate information about the own vehicle and the periphery (for example, inter-vehicle distances D1, D2 from other vehicles positioned forward and rearward of the own vehicle, the traveling position of the own vehicle on a lane of a road surface, and the like), and an autonomous driving mode signal from an autonomous driving switch 57. Examples of the periphery recognition device 56 include a camera, a millimeter wave radar, a quasi-millimeter wave radar, an infrared laser radar, and a sonar. The autonomous driving switch 57 is a switch for the switching among a full-autonomous driving mode in which all driving operations are autonomously performed, a semi-autonomous driving mode in which some of the driving operations are performed by the driver, and a manual driving mode in which the driving operations are performed by the driver. Examples of the semi-autonomous driving mode include an adaptive cruise control. Hereinafter, descriptions will be made assuming that the semi-autonomous driving mode is the adaptive cruise control. An assist control for avoiding or reducing collision is performed regardless of the autonomous driving mode. As described above, the periphery recognition ECU 55 communicates with the main ECU 30 and the shift ECU 50 through the communication port.

The navigation device 60 includes a main body 62 in which a control unit is incorporated, a GPS antenna 64 that receives information relevant to the current place of the own vehicle, and a display 66. The control unit of the main body 62 includes a storage medium (for example, a hard disk or an SSD) in which map information and the like are stored, input and output ports, and a communication port. In the map information, service information (for example, sightseeing information and parking place information), road information about each traveling section (for example, a section between traffic lights or a section between intersections), and the like are stored as a database. The road information includes distance information, width information, lane number information, district information (city areas and suburban areas), type information (a general road and an expressway), gradient information, legal speed limits, the number of traffic lights, the turning radius of each curve, and the like. The display 66 is configured as a touch panel display that displays a variety of information such as information relevant to the current place of the own vehicle and a planned traveling route to a destination and through which a user can input a variety of instructions. When the destination is set through the operation of the display 66 by the user, the main body 62 of the navigation device 60 sets the planned traveling route from the current place of the own vehicle to the destination, based on the map information stored in the main body 62, the current place of the own vehicle from the GPS antenna 64, and the destination, and displays the set planned traveling route on the display 66, to perform route guidance.

Next, the behavior of the automobile 20 in the embodiment that has this configuration, particularly, the behavior when the driver depresses the accelerator pedal 46 at the time of the traveling in the full-autonomous driving mode or the semi-autonomous driving mode will be described. At the time of the traveling in the full-autonomous driving mode or the semi-autonomous driving mode, the main ECU 30 computes a torque (referred to as an "autonomous driving torque", hereinafter) that needs to be output to the output shaft 22a of the drive device 22 for the traveling, depending on the vehicle speed V, the acceleration a, the inter-vehicle distance from a proceeding vehicle, and the like, sets the computed torque as a required torque T*, and drives and controls the drive device 22 such that the set required torque T* is output to the output shaft 22a. At the time of the traveling in the manual driving mode, the main ECU 30 computes a torque (referred to as a "manual driving torque", hereinafter) that needs to be output to the output shaft 22a of the drive device 22 for the traveling, depending on the depression amount of the accelerator pedal 46 by the driver and the vehicle speed V, sets the computed torque as the required torque T*, and drives and controls the drive device 22 such that the set required torque T* is output to the output shaft 22a. Therefore, there is a problem in determining which of the autonomous driving torque and the manual driving torque is set as the required torque T*, in the case where the driver has selected the full-autonomous driving mode or the semi-autonomous driving mode as the driving mode and where the driver has depressed the accelerator pedal 46. Similarly, there is a problem in determining which of an autonomous driving braking torque and a manual driving braking torque is set as a required braking torque, in the case where the driver has selected the full-autonomous driving mode or the semi-autonomous driving mode as the driving mode and where the driver has depressed the brake pedal 48. In the embodiment, the main ECU 30 executes an override permission process exemplified in FIG. 2, so that the above problems are solved. As described above, the override means that the control is performed based on the requested value due to the operation (the accelerator operation, the brake operation, or the like) by the driver in the case where the full-autonomous driving mode or the semi-autonomous driving mode has been selected as the driving mode and where the requested value due to the operation by the driver is larger than the requested value computed by the main ECU 30 at the time of the traveling in the full-autonomous driving mode or the semi-autonomous driving mode.

When the override permission process is executed, the main ECU 30, first, determines whether the driver has selected the full-autonomous driving mode as the driving mode (step S100). This determination can be performed by checking the autonomous driving mode signal from the autonomous driving switch 57. When it is determined that the driver has selected the full-autonomous driving mode as the driving mode, the override caused by the accelerator operation by the driver is prohibited (step S110). In addition, the override caused by the brake operation by the driver is permitted (step S140). Then, the process is ended. That is, even in the case where the driver has selected the full-autonomous driving mode as the driving mode and where the manual driving torque exceeds the autonomous driving torque due to a large depression of the accelerator pedal 46 by the driver, the autonomous driving torque is set as the required torque T*, and the drive device 22 is controlled. Moreover, in the case where the manual driving braking torque exceeds the autonomous driving braking torque due to a large depression of the brake pedal 48 by the driver, the manual driving braking torque is set as the required braking torque, and the brake device 24 is controlled. The purpose of prohibiting the override caused by the accelerator operation by the driver when the driver has selected the full-autonomous driving mode as the driving mode is to restrain the override due to an unexpected accelerator operation. The purpose of permitting the override caused by the brake operation by the driver when the driver has selected the full-autonomous driving mode as the driving mode is to prioritize the braking of the vehicle due to the operation by the driver even during the autonomous driving in the full-autonomous driving mode.

When it is determined in step S100 that the driver has not selected the full-autonomous driving mode as the driving mode, it is determined whether the driver has selected the semi-autonomous driving mode as the driving mode (step S120). When it is determined that the driver has selected the semi-autonomous driving mode as the driving mode, the override caused by the accelerator operation by the driver is permitted (step S130). In addition, the override caused by the brake operation by the driver is permitted (step S140). Then, the process is ended. That is, in the case where the driver has selected the semi-autonomous driving mode as the driving mode and where the manual driving torque exceeds the autonomous driving torque due to a large depression of the accelerator pedal 46 by the driver, the manual driving torque is set as the required torque T*, and the drive device 22 is controlled. In the case where the manual driving braking torque exceeds the autonomous driving braking torque due to a large depression of the brake pedal 48 by the driver, the manual driving braking torque is set as the required braking torque, and the brake device 24 is controlled. The purpose of permitting the override caused by the acceleration operation by the driver when the driver has selected the semi-autonomous driving mode as the driving mode is to prioritize the accelerator operation by the driver. The purpose of permitting the override caused by the brake operation by the driver when the driver has selected the semi-autonomous driving mode as the driving mode is to prioritize the braking of the vehicle due to the brake operation by the driver even during the semi-autonomous driving.

In the above-described automobile 20 in the embodiment, when the driver has selected the semi-autonomous driving mode as the driving mode, the override caused by the accelerator operation by the driver is permitted. When the driver has selected the full-autonomous driving mode as the driving mode, the override caused by the accelerator operation by the driver is prohibited. Thereby, when the driver has selected the semi-autonomous driving mode as the driving mode, the accelerator operation by the driver is prioritized. When the driver has selected the full-autonomous driving mode as the driving mode, it is possible to cope with an unexpected accelerator operation. As a result, it is possible to more properly control the override caused by the accelerator operation by the driver.

Further, in the automobile 20 in the embodiment, even when the driver has selected the semi-autonomous driving mode or the full-autonomous driving mode as the driving mode, the override caused by the brake operation by the driver is permitted. Thereby, even when the driver has selected the semi-autonomous driving mode or the full-autonomous driving mode as the driving mode, it is possible to prioritize the braking of the vehicle due to the brake operation by the driver.

In the automobile 20 in the embodiment, when the driver has selected the full-autonomous driving mode as the driving mode, the override caused by the accelerator operation by the driver is prohibited. However, the override caused by the accelerator operation by the driver may be restricted. For example, when the manual driving torque exceeds the autonomous driving torque by a predetermined value or more, the required torque T* may be set to a value resulting from subtracting the predetermined value from the manual driving torque, and the brake device 24 may be controlled. Alternatively, when a value resulting from multiplying the manual driving torque by a coefficient k smaller than one exceeds the autonomous driving torque, the required torque T* may be set to the value resulting from multiplying the manual driving torque by the coefficient k, and the brake device 24 may be controlled.

In the automobile 20 in the embodiment, in some cases, the driving mode is automatically selected by the main ECU 30, depending on the situation. The permission about the override in this case is performed by an automatic-setting override permission process exemplified in FIG. 3.

Figure 2:
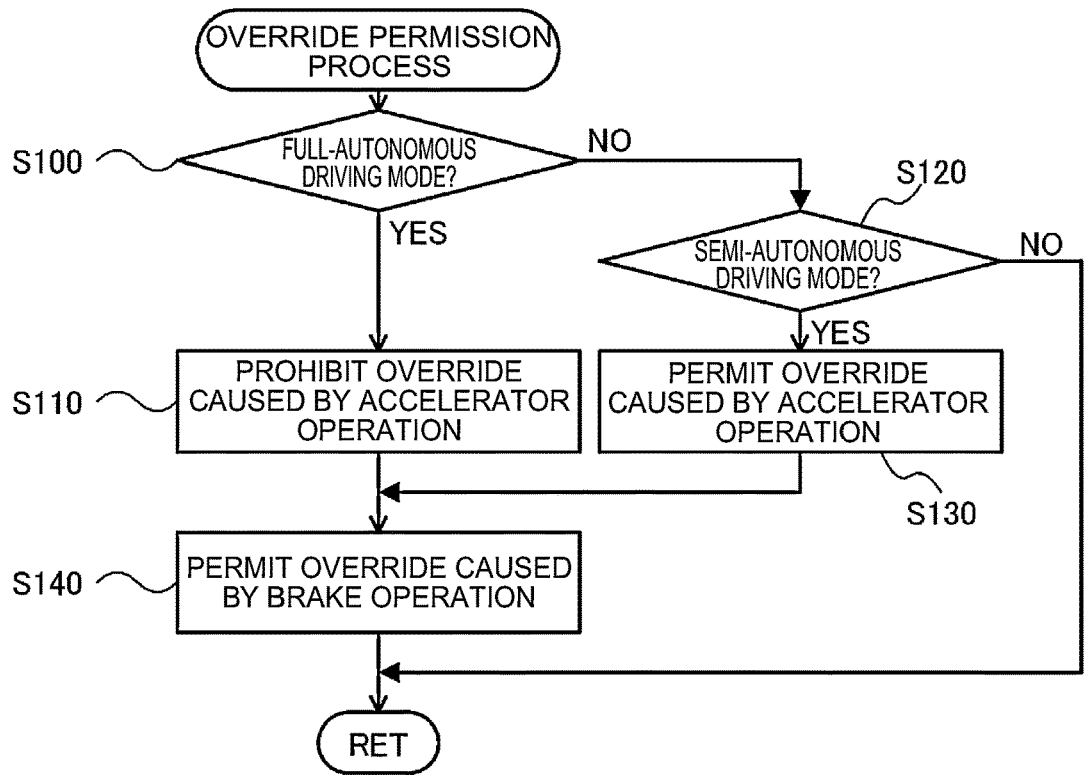
FIG. 2 is a flowchart showing an exemplary override permission process that is executed by a main ECU shown in FIG. 1.
Figure 3:
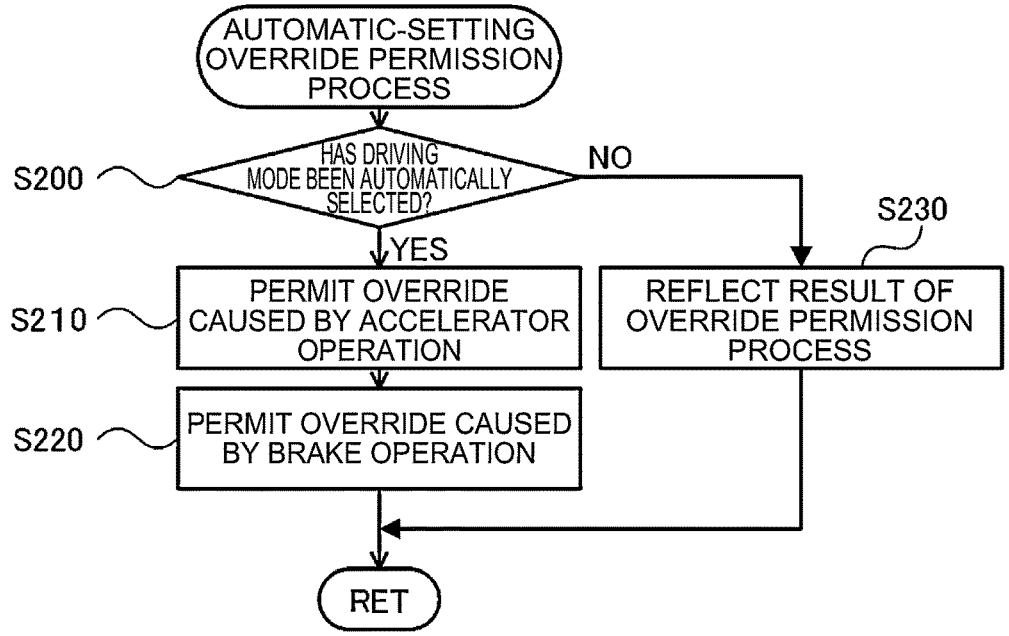
FIG. 3 is a flowchart showing an exemplary automatic-setting override permission process that is executed by the main ECU.

When the automatic-setting override permission process in FIG. 3 is executed, the main ECU 30, first, determines whether the driving mode has been automatically selected (step S200). The determination can be performed by the main ECU 30, by determining whether the automatic selection of the driving mode has been performed. When it is determined that the driving mode has not been automatically selected, that is, when it is determined that the driving mode has been selected by the driver, the result of the override permission process exemplified in FIG. 2 is reflected (step S230), and the process is ended. The override permission process exemplified in FIG. 2 has been described above.

When it is determined in step S200 that the driving mode has been automatically selected, the override caused by the accelerator operation by the driver is permitted regardless of whether the full-autonomous driving mode is selected or the semi-autonomous driving mode is selected (step S210). In addition, the override caused by the brake operation by the driver is permitted (step S220). Then, the process is ended. When the full-autonomous driving mode has been automatically selected as the driving mode, the override caused by the accelerator operation by the driver is permitted. When the driver has selected the full-autonomous driving mode as the driving mode, the override caused by the accelerator operation by the driver is prohibited. In consideration of this, it can be said that the override caused by the accelerator operation by the driver when the driver has selected the driving mode is restricted compared to when the driving mode has been automatically selected. In other words, the restriction of the override caused by the accelerator operation by the driver when the driving mode has been automatically selected is reduced compared to when the driving mode has been selected by the driver. Thereby, it is possible to prioritize the accelerator operation by the driver, when the full-autonomous driving mode or the semi-autonomous driving mode has been automatically selected as the driving mode.

In the automobile 20 in the embodiment, the drive ECU 23 is used for controlling the drive device 22, and the brake ECU 25 is used for controlling the brake device 24. However, all or some of the functions of the drive ECU 23 and the brake ECU 25 may be performed by the main ECU 30.

The correspondence relation between major elements in the embodiment and major elements in the disclosure described in the section "SUMMARY" will be described. The periphery recognition device 56 in the embodiment is an example of the "periphery recognition device" in the disclosure. The drive device 22 is an example of the "drive device". The brake device 24 is an example of the "brake device". The steering device 26 is an example of the "steering device". The drive ECU 23, the brake ECU 25, the main ECU 30 and the like are examples of the "electronic control unit".

The correspondence relation between the major elements in the embodiment and the major elements in the disclosure described in the section "SUMMARY" does not limit the elements in the disclosure described in the section "SUMMARY", because the embodiment is an example for specifically describing a mode for carrying out the disclosure described in the section "SUMMARY". That is, the interpretation about the disclosure described in the section "SUMMARY" should be performed based on the description in the section, and the embodiment is just a specific example of the disclosure described in the section "SUMMARY".

The mode for carrying out the present disclosure has been described above with use of the embodiment. The present disclosure is not limited to the embodiment in any way, and naturally, can be carried out as various modes without departing from the spirit of the present disclosure.

The present disclosure can be utilized in an automobile manufacturing industry and the like.

What is claimed is:

1. An automobile comprising an electronic control unit configured to control a drive device, a brake device, and a steering device such that traveling is performed in a driving mode selected by a driver from a full-autonomous driving mode, a semi-autonomous driving mode, and a manual driving mode, using information from a periphery recognition device that acquires information about a periphery of a vehicle, wherein:
   the electronic control unit is configured to permit an override request due to an accelerator operation by the driver, when the driver has selected the semi-autonomous driving mode; and
   the electronic control unit is configured to restrict the override request due to the accelerator operation by the driver, when the driver has selected the full-autonomous driving mode, compared to when the driver has selected the semi-autonomous driving mode.

2. The automobile according to claim 1, wherein the electronic control unit is configured to restrict the override request due to the accelerator operation by the driver by controlling the brake device, when the driver has selected the full-autonomous driving mode, compared to when the driver has selected the semi-autonomous driving mode.

3. The automobile according to claim 1, wherein the electronic control unit is configured to prohibit the override request due to the accelerator operation by the driver, when the driver has selected the full-autonomous driving mode.

4. The automobile according to claim 1, wherein the electronic control unit is configured to restrict override caused by the accelerator operation by the driver, when the driver has selected the full-autonomous driving mode.

5. The automobile according to claim 1, wherein the electronic control unit is configured to control the brake device by setting a required torque to a value resulting from subtracting a predetermined value from a manual driving torque, when the manual driving torque exceeds an autonomous driving torque by the predetermined value or more.

6. The automobile according to claim 1, wherein the electronic control unit is configured to control the brake device by setting a required torque to a value resulting from multiplying a manual driving torque by a coefficient smaller than one, when the value resulting from multiplying the manual driving torque by the coefficient exceeds an autonomous driving torque.

7. The automobile according to claim 1, wherein:
the electronic control unit is configured to execute an automatic selection by which one of the full-autonomous driving mode and the semi-autonomous driving mode is selected without the selection by the driver, depending on a situation; and
the electronic control unit is configured to restrict the override request due to the accelerator operation by the driver at a time of the traveling in the driving mode selected by the driver, compared to the override request due to the accelerator operation by the driver at a time of the traveling in the driving mode by the automatic selection.

8. The automobile according to claim 7, wherein the electronic control unit is configured to restrict the override request due to the accelerator operation by the driver at the time of the traveling in the driving mode selected by the driver, by controlling the brake device, compared to the override request due to the accelerator operation by the driver at the time of the traveling in the driving mode by the automatic selection.

9. The automobile according to claim 1, wherein the electronic control unit is configured to permit an override request due to a brake operation by the driver, regardless of whether the driver has selected the semi-autonomous driving mode or the full-autonomous driving mode.

10. A control method for an automobile, comprising:
controlling a drive device, a brake device, and a steering device such that traveling is performed in a driving mode selected by a driver from a full-autonomous driving mode, a semi-autonomous driving mode, and a manual driving mode, using information from a periphery recognition device that acquires information about a periphery of a vehicle;
permitting an override request due to an accelerator operation by the driver, when the driver has selected the semi-autonomous driving mode; and
restricting the override request due to the accelerator operation by the driver, when the driver has selected the full-autonomous driving mode, compared to when the driver has selected the semi-autonomous driving mode.

* * * * *